United States Patent
Kim et al.

(10) Patent No.: US 9,971,631 B2
(45) Date of Patent: May 15, 2018

(54) METHOD AND APPARATUS FOR SCHEDULING PIPELINE OF MULTIPROCESSOR-BASED MOTION CONTROL SOFTWARE

(71) Applicant: FOUNDATION OF SOONGSIL UNIVERSITY INDUSTRY COOPERATION, Seoul (KR)

(72) Inventors: Kang-Hee Kim, Seongnam-si (KR); Hyeong-Seok Kang, Seoul (KR); Jin-Young Choi, Seoul (KR); Joon-Woo Lee, Namyangju-si (KR)

(73) Assignee: FOUNDATION OF SOONGSIL UNIVERSITY INDUSTRY COOPERATION, Seoul (KR)

(*) Notice: Subject to any disclaimer, the term of this patent is extended or adjusted under 35 U.S.C. 154(b) by 88 days.

(21) Appl. No.: 15/035,433

(22) PCT Filed: Nov. 29, 2013

(86) PCT No.: PCT/KR2013/010975
§ 371 (c)(1),
(2) Date: May 9, 2016

(87) PCT Pub. No.: WO2015/068891
PCT Pub. Date: May 14, 2015

(65) Prior Publication Data
US 2016/0292005 A1    Oct. 6, 2016

(30) Foreign Application Priority Data

Nov. 8, 2013 (KR) .................... 10-2013-0135098

(51) Int. Cl.
*G06F 9/48* (2006.01)
*G06F 12/02* (2006.01)
(Continued)

(52) U.S. Cl.
CPC .......... *G06F 9/4887* (2013.01); *G06F 12/023* (2013.01); *G06F 13/24* (2013.01);
(Continued)

(58) Field of Classification Search
CPC ...... G06F 9/4887; G06F 12/023; G06F 13/24; G06F 13/28; G06F 13/4234; G06F 2212/1044
See application file for complete search history.

(56) References Cited

U.S. PATENT DOCUMENTS

| 6,047,351 A | 4/2000 | Cheng |
| 6,216,059 B1* | 4/2001 | Ierymenko ............. G10H 3/181 700/280 |
| 2016/0124981 A1* | 5/2016 | Jiang .................. G05B 19/4093 707/821 |

FOREIGN PATENT DOCUMENTS

WO    2013/010159 A1    1/2013

OTHER PUBLICATIONS

Soo-Hyun Kim, "Optimization of Pipeline Scheduling for Multi-core System Design", Graduate School of Hanyang University, Feb. 2011, pp. 1-46.
(Continued)

*Primary Examiner* — Eric T Oberly
(74) *Attorney, Agent, or Firm* — Hauptman Ham, LLP (57) ABSTRACT

According to the present invention, a method comprising: (a) calculating, by an admission control program, a parameter for scheduling a pipeline using a maximum allowable period and an execution time for each of N motion tasks, wherein the parameter includes an optimal periodic value, a task offset and an input/output offset for each of the N tasks; (b) generating, by a coordinator program, N motion tasks, wherein one of the N motion tasks is determined to be a reference task, and the other is determined to be a non-reference task; (c) allowing, by the reference task and the (Continued)

non-reference task, an operating system to generate a task wakeup timer and an input/output (I/O) initiating timer; and (d) setting, by the non-reference task, a task offset and an input/output offset for an own timer on the basis of the task wakeup timer of the reference task.

9 Claims, 8 Drawing Sheets

(51) Int. Cl.
*G06F 13/24* (2006.01)
*G06F 13/28* (2006.01)
*G06F 13/42* (2006.01)

(52) U.S. Cl.
CPC .......... *G06F 13/28* (2013.01); *G06F 13/4234* (2013.01); *G06F 2212/1044* (2013.01)

(56) References Cited

OTHER PUBLICATIONS

Praveen Jayachandran and Tarek Abdelzaher "A Delay Composition Theorem for Real-Time Pipelines", Department of Computer ScienceUniversity of Illinois, Jul. 2007, pp. 1-10.
International Search Report dated Aug. 14, 2014 corresponding to International Application No. PCT/KR2013/010975.
Soo-Hyun Kim, "Optimization of Pipeline Scheduling for Multi-core System Design" with English Abstract, Graduate School of Hanyang University, Feb. 2011, pp. 1-49.

\* cited by examiner

METHOD AND APPARATUS FOR SCHEDULING PIPELINE OF MULTIPROCESSOR-BASED MOTION CONTROL SOFTWARE

CROSS REFERENCE TO RELATED APPLICATION

This application claims the priority of Korean Patent Application No. 10-2013-0135098, filed on Nov. 08, 2013 in the KIPO (Korean Intellectual Property Office). Further, this application is the National Phase application of International Application No. PCT/KR2013/010975 filed Nov. 29, 2013, which designates the United States and was published in Korean.

TECHNICAL FIELD

The present invention relates to a method and an apparatus for scheduling a pipeline of multiprocessor-based motion control software.

BACKGROUND ART

Motion control software has a structure in which motion tasks configuring the motion control software wake up every cycle required by each task to execute the motion control software. In this case, in each task, an interval between the wakeup times needs to be accurately matched with the cycle, but the intervals may not be uniform according to an operating system. This causes a task activation jitter.

In order to reduce the task activation jitter in a Linux operating system, a PREEMPT_RT real-time patch is proposed, and a structure in which a real-time operating system and a non-real-time operating system (e.g. Linux) are executed on a dual operating system structure such as Xenomai or RTAI, that is, a single processor is proposed.

The task activation jitter is propagated and accumulated to next steps of the pipeline to eventually cause actuation moments of each motor to be temporally shaken. Further, the task activation jitter increases an end-to-end delay time of the motion task and acts as an obstacle to shortening the cycle of the task.

The PREEMPT_RT patch and the dual operating system structure need to correct or re-create all device drivers used in the operating system, in order to reduce the task activation jitter of the motion control software.

In Korea Patent Publication No. 2002-0068651 (title of invention: Extended task scheduling algorithm considering execution of XIP task and regeneration of flash memory), a measure for solving a problem in which the flash memory cannot perform a reading process while performing a regeneration process is proposed.

DISCLOSURE

Technical Problem

An embodiment of the present invention is directed to a method and an apparatus for scheduling a pipeline of processor-based motion control software which requires correction of a part of application software executed on an operating system without almost requiring the correction of the device driver.

Technical Solution

According to an aspect of the present invention, there is provided a method for scheduling a pipeline of multiprocessor-based motion control software, the method comprising: (a) calculating, by an admission control program, a parameter for scheduling a pipeline using a maximum allowable period and an execution time for each of N motion tasks, wherein the parameter includes an optimal periodic value, a task offset and an input/output offset for each of the N tasks; (b) generating, by a coordinator program, N motion tasks, wherein one of the N motion tasks is determined to be a reference task, and the other is determined to be a non-reference task; (c) allowing, by the reference task and the non-reference task, an operating system to generate a task wakeup timer and an input/output (I/O) initiating timer; and (d) setting, by the non-reference task, a task offset and an input/output offset for an own timer on the basis of the task wakeup timer of the reference task.

The pipeline may include first, second, and third pipeline steps.

A delay time may be added between the first pipeline step and the second pipeline step, and the delay time may not be added between the second pipeline step and the third pipeline step.

The first pipeline step may include a process of calculating, by the motion task, a motion trajectory based on motion state information collected in a previous cycle and requesting generation of an Ethernet packet and a process of transmitting and receiving, by an Ethernet driver, the an Ethernet master protocol stack generating a packet and the packet, the second pipeline step may include a process of transferring the packet from a memory bus to an Ethernet card and a process of receiving an Ethernet packet that circulates and returns motor drivers from the Ethernet card, and the third pipeline step may include a process of processing an Ethernet packet transmission/reception complete interrupt of the memory bus.

In step (a), the parameters may be calculated by using a method of concurrency-oriented parameters in which the first pipeline step is allocated to a first processor, the second pipeline step is allocated to the memory bus, and the third pipeline step is allocated to a second processor.

In step (a), the parameters may be calculated by using a method of availability-oriented parameters in which the first pipeline step is allocated to the first processor, the second pipeline step is allocated to the memory bus, and the third pipeline step is allocated to the second processor.

The step (a) may include determining whether an optimal cycle value of each of the N tasks is smaller than the maximum allowable period.

According to another aspect of the present invention, there is provided a computer-readable medium in which a program that performs the method is recoded.

According to yet another aspect of the present invention, there is provided an apparatus for scheduling a pipeline of multiprocessor-based motion control software, the apparatus comprising: a reception module configured to receive a maximum allowable period and an execution time for each of N motion tasks from a coordinator program; a parameter calculation module configured to calculate parameters for pipeline scheduling by using the maximum allowable period and the execution time—the parameters include an optimal cycle value, a task offset, and an I/O offset—; and a transmission module configured to transmit the calculated parameters to the coordinator program, in which the coordinator program generates the N motion tasks, one of the N motion tasks is determined as a reference task and the remaining tasks are determined as non-reference tasks, the reference task and the non-reference task allows the operating system to generate a task wakeup timer and an I/O initiating timer, and the non-reference task sets a task offset and an I/O offset for a timer of the non-reference task based on the task wakeup timer of the reference task.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

Advantageous Effects

According to the present invention, it is possible to minimize a task activation jitter by executing motion control software by a three-step pipeline method and determining and scheduling a phase for each step of the task in advance so as to perform each task in each step without collision and improve performance up to three times as compared with a non-pipelined execution method.

BEST MODE FOR THE INVENTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

1) Definition of Problems

In general, it is expected that a pipeline executes steps configuring the pipeline to be temporally adjacent to each other. In other words, step 2 starts to be executed immediately after step 1 is completed, and step 3 starts to be executed immediately after the step 2 is completed. On the assumption, when a plurality of tasks having different execution times is executed for each step without collision, reduction in resource availability is caused for each step of the pipeline as illustrated in FIG. 1.

Figure 1:
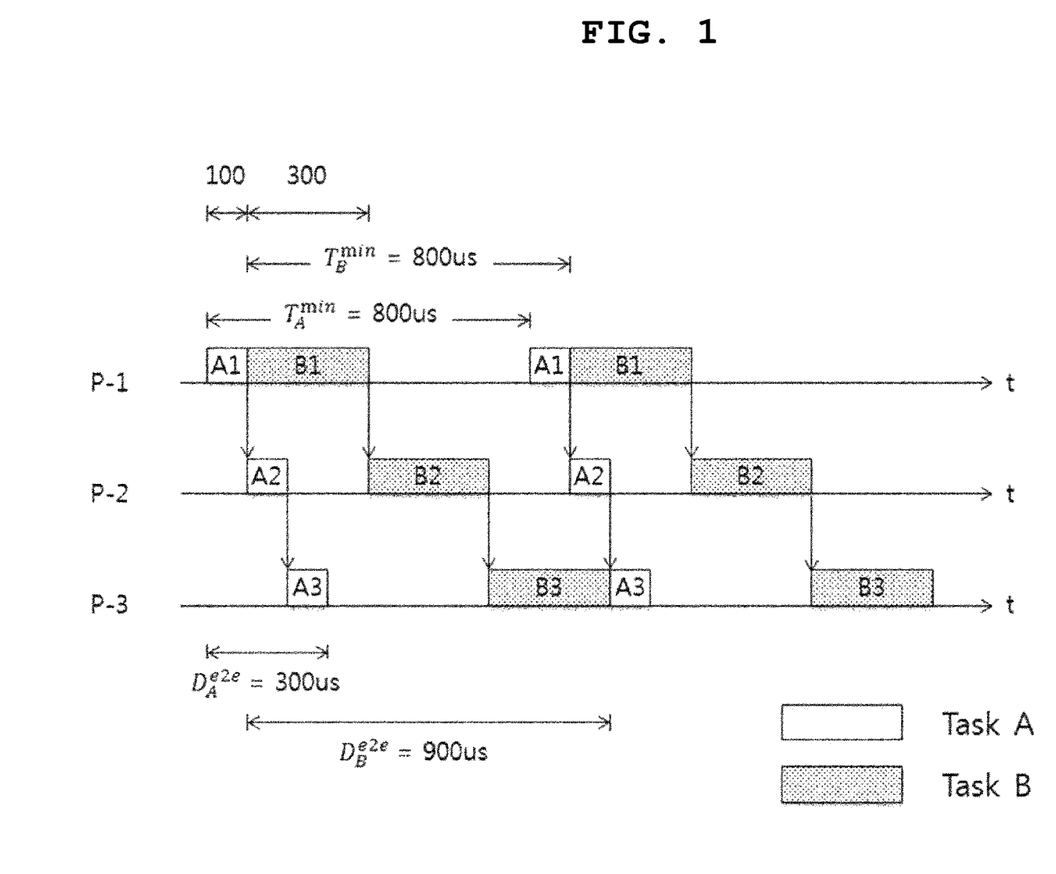
FIG. 1 is a diagram illustrating a three-step pipeline example (assuming adjacent execution for each step) of two tasks.

FIG. 1 is a diagram illustrating a three-step pipeline example (assuming adjacent execution for each step) of two tasks (takes A and B) and in FIGS. 1, P-1, P-2, and P-3 mean processors 1, 2, and 3.

In FIG. 1, the takes A and B have execution times of 100 and 200 at each step, respectively, and are cases where phases are adjusted so as to be executed without collision. In this case, since it is assumed that the two tasks need to execute each step without collision and execute each step to be adjacent to each other in terms of each task, the execution cycle of the two tasks may be smaller than 800.

However, if necessary, if pipeline steps of any task(s) are delayed and executed without being adjacent to an end time of the previous step, the cycles of the tasks may be further reduced and the resource availability may be increased.

Figure 2:
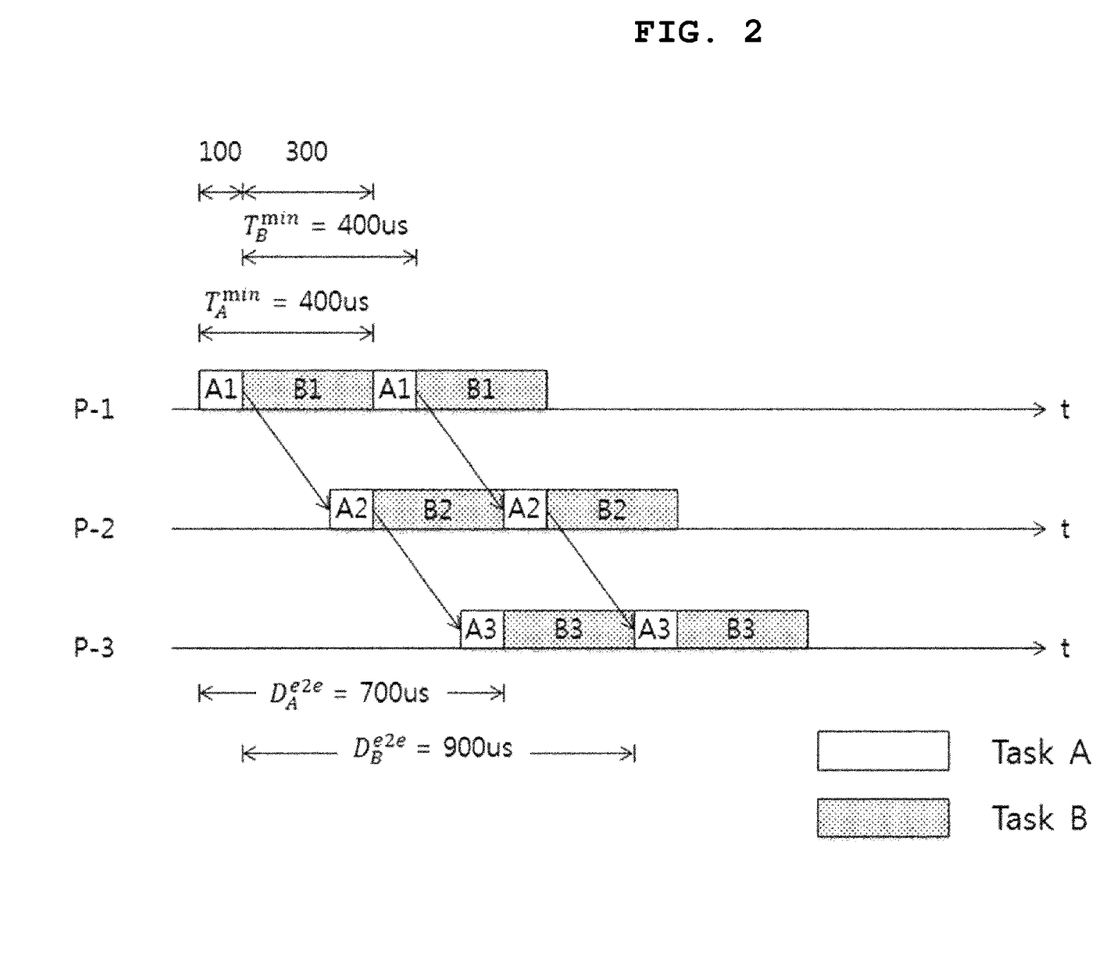
FIG. 2 is a diagram illustrating a three-step pipeline example (allowing delay execution for each step) of two tasks.

FIG. 2 is a diagram illustrating a case where with respect to the task A, a delay time of 200 is allowed between the steps 1 and 2 and a delay time of 200 is allowed between the steps 2 and 3.

That is, FIG. 2 is a diagram illustrating a three-step pipeline example (allowing delay execution for each step) of two tasks.

In the task A, an end-to-end delay time taken to perform all of the steps is increased from 300 to 700 as compared with FIG. 1, but the cycle is decreased from 800 to 400. As a result, even while the two task perform the steps without collision, in terms of the resource allocated to each step, the entire idle times are reduced and thus, the resource availability are increased.

The present invention intends to minimize the cycle of each task and increase the resource availability when the tasks perform the steps without collision by allowing the delay execution for each step according to a task like the example.

Figure 3:
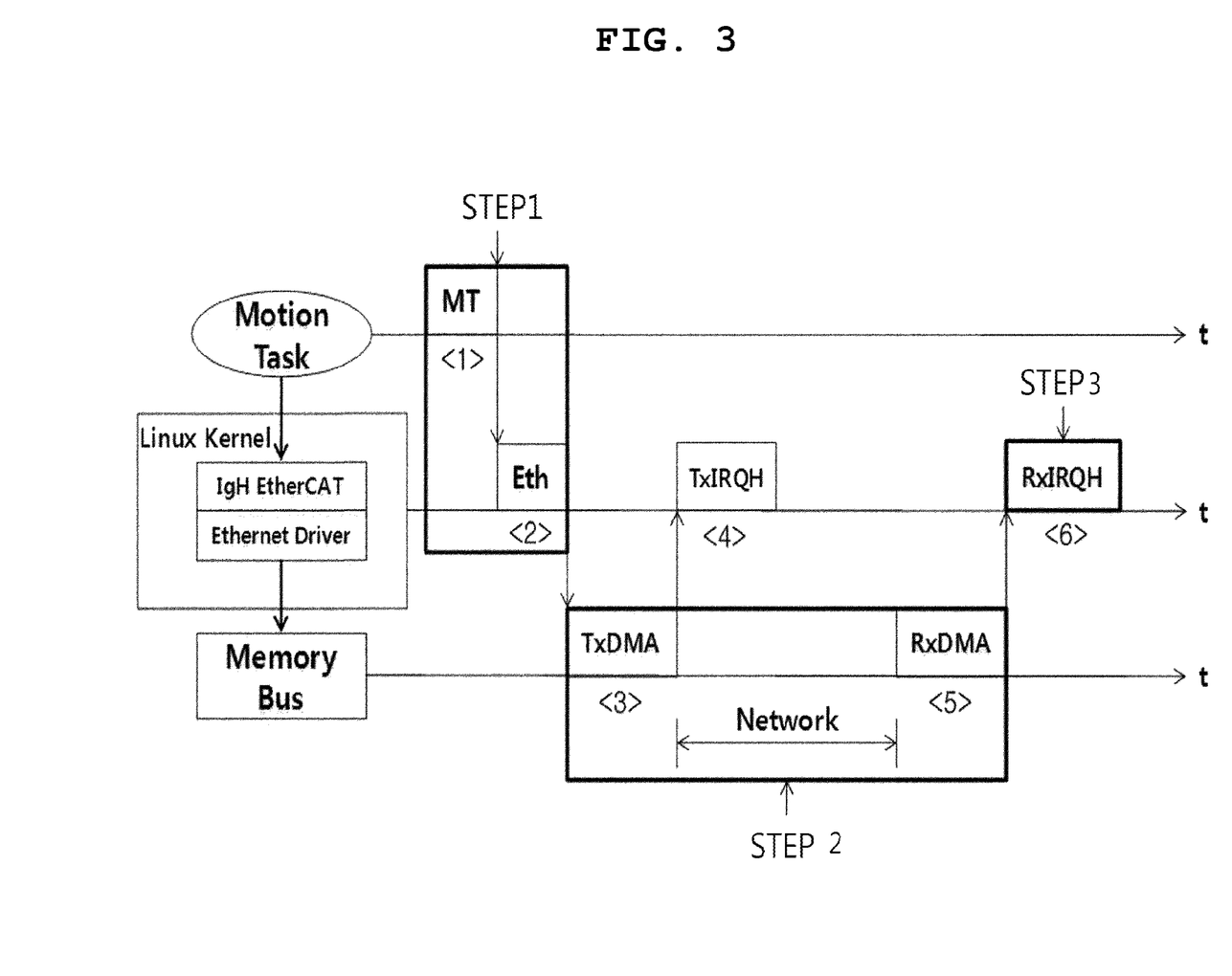
FIG. 3 is a configuration diagram of a pipeline of an Ethernet-based motion controller.

As the exemplary embodiment of the present invention, in the case of the motion control software, the delay execution may be allowed between the steps 1 and 2, and a special constraint condition without allowing the delay execution may be present between the steps 2 and 3, FIG. 3 is a configuration diagram of a pipeline of an Ethernet-based motion controller.

MT means a motion task of calculating a motion trajectory on the basis of motion state information collected in a previous cycle and requesting generation of an Ethernet packet, Eth means an Ethernet driver that is responsible for transmission and reception of an Ethernet master protocol stack generating a packet and the packet, Tx direct memory access (TxDMA) means DMA for transferring the packet to an Ethernet card, Network is a process in which the transmitted packet circulates motor drives, RxDMA means DMA for receiving the Ethernet packet that returns after circulating the motor drives, and finally, RxIRQH means a process for processing a complete interrupt.

In the present invention, the six-step pipeline is modeled to a three-step pipeline, and the three-step pipeline model is constituted by an MT/Eth step (step 1) of binding the MT and the Eth in one step, a DMA/Net step (step 2) of binding from a TxDMA start time to an RxDMA end time and finally, an IRQH step (step 3) configured of RxIRQH. TxIRQH means a process of processing a TxDMA complete interrupt, and generally has a minimal execution time as compared with the RxIRQH and is not displayed in the three-step pipeline by adding the minimal execution time to a worst execution time of the motion task.

In FIG. 3, it is assumed that the delay time may not be added between the steps 2 and 3. The reason is that according to implementation of an interrupt processing function, when a homogenous interrupt which is induced by another task occurs while the interrupt is processed (that is, while the step 3 of the task A is executed) (that is, the step 2 of the task B ends), the interrupt processing process which is in progress may attempt to be bound and processed up to the subsequent interrupt. As a result, the step 3 of the task A is combined with the step 3 of the task B to be completed together other than completed in sequence.

Accordingly, pipeline parameters for the motion control software are defined as follows by reflection the constraint condition.

TABLE 1

Pipeline parameters

| Parameter | Meaning |
|---|---|
| $T_i^{max}$ | Maximum cycle value (maximum allowable period) allowed by system designer with respect to i-th task |
| $E_i$ | $max(E_1, E_2, \ldots, E_{s,i})$, maximum value among execution times for each step of i-th task |
| $T_i$ | Minimum cycle value of i-th task obtained through determining of scheduling parameter |
| $\Phi_{i,1}$ | Phase of the first pipeline step of i-th task. Called a task offset. Mean offset up to execution start time of the first step of i-th task based on the time when a reference task starts the execution ($0 \leq \Phi_{i,1} \leq T_i$). |
| $\Phi_{i,2}$ | Phase of second pipeline step of i-th task. Called an I/O offset. Mean offset up to execution start time of step 2 of i-th task based on the time when a reference task starts the execution ($0 \leq \Phi_{i,2} \leq T_i$). |

2) Technical Solution

Figure 4:
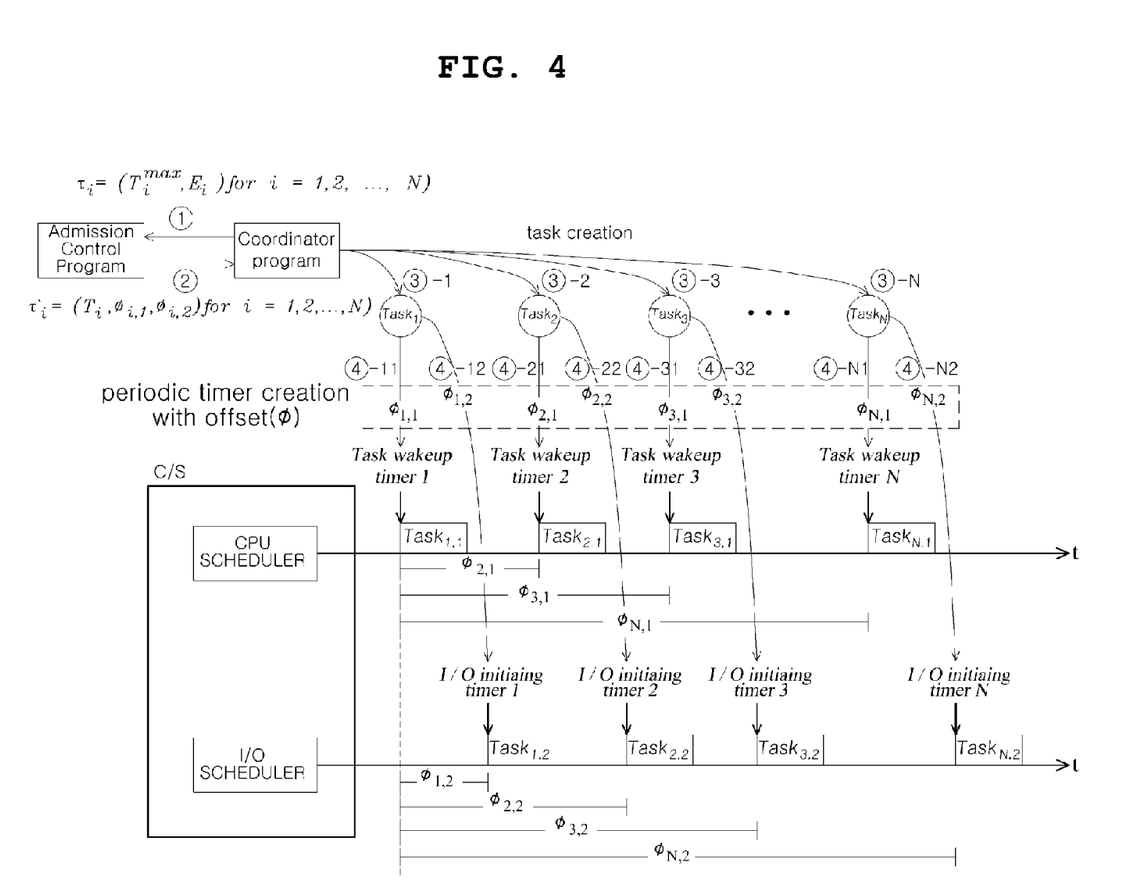
FIG. 4 is a diagram illustrating an apparatus according to the present invention.

FIG. 4 is a diagram illustrating an apparatus according to the present invention.

The motion control software is largely divided into an admission control program (ACP), a coordinator program (CP), and a motion task (MT) controlling each domain.

The ACP receives execution parameters of an MT set from the CP to perform determining a pipeline parameter which automatically calculates an optimal cycle value at which all of the MTs may operate on the pipeline without collision and a phase value for each step of each task.

Then, the CP notifies the optimal cycle value and the phase value for each step to each MT, and each MT generates a timer that allows the operating system to force the optimal cycle value and the phase value for each step to perform a pipeline execution step of allowing the operating system to force the pipelined execution.

The ACP according to the present invention is a subject for the pipeline scheduling and may include a reception module that receives the maximum allowable period and the execution time for each of N motion tasks from the CP, a parameter calculation module that calculates a parameter including an optimal cycle value for each of the N motion tasks, a task offset, and an input/output offset by using the maximum allowable period and the execution time, and a transmission module that transmits the calculated parameter to the CP.

2-1) Determining Pipeline Parameter

The determining of the scheduling parameter is a process of calculating parameters (the control cycle, the task offset, and the I/O offset) for forcing the phases of the pipeline steps. the pipeline scheduling and the parameter calculation are performed by the ACP of FIG. 4. In ①, the CP inputs the maximum allowable period for the N tasks and the execution time $\tau_i=(T_i^{max},E_i)$ to the ACP. In ②, the ACP calculates $\tau'_i=(T_i,\Phi_{i,1},\Phi_{i,2})$ by internally performing the pipeline scheduling in real time and then transmits the calculated parameters to the CP.

Figure 5:
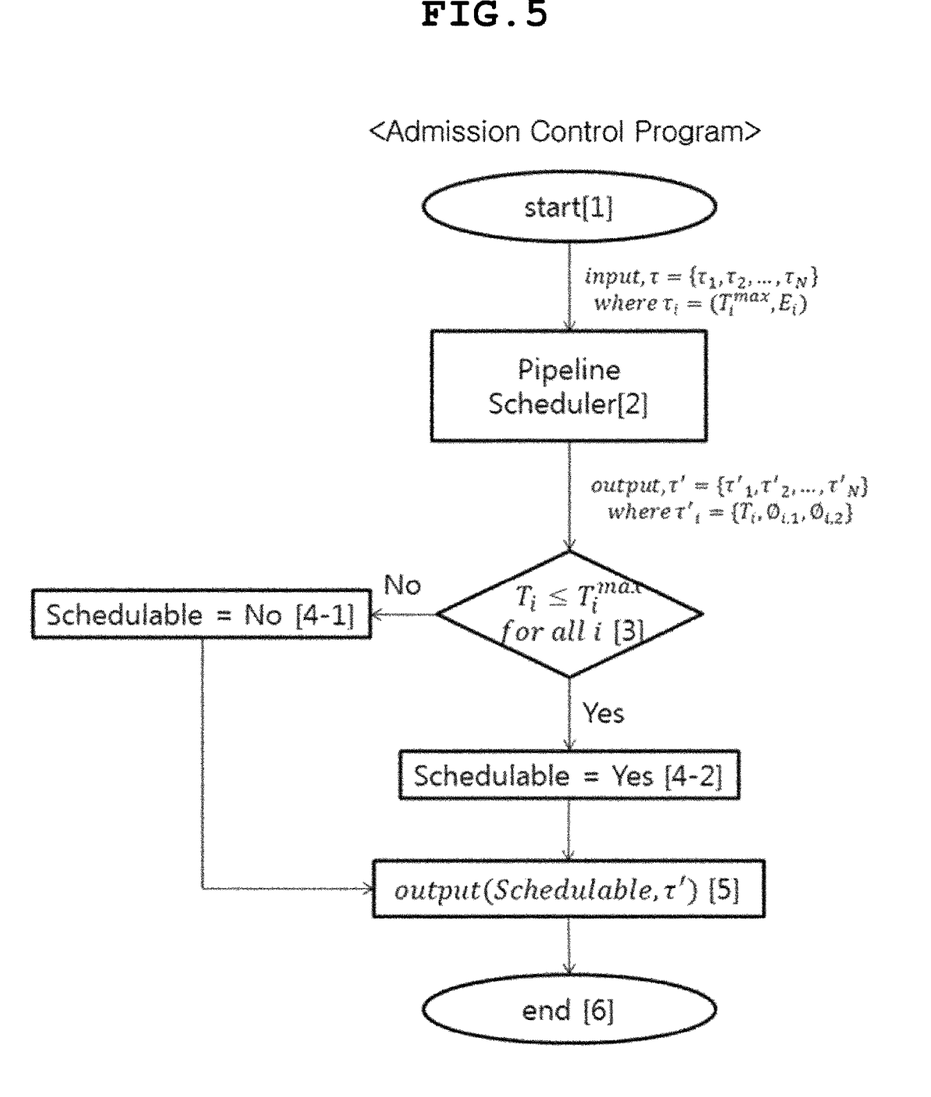
FIG. 5 is a diagram illustrating an ACP operation (determining pipeline parameters) according to the present invention.

FIG. 5 is a diagram illustrating an ACP operation (determining pipeline parameters) according to the present invention.

The ACP that calculates a parameter set of the task operates in order illustrated in FIG. 5. In [1], the program receives $\tau_i=(T_i^{max},E_i)$ to input the received $\tau_i=(T_i^{max},E_i)$ to the pipeline scheduler (PS) of [2]. The PS calculates an output parameter set $\tau'_i=(T_i,\Phi_{i,1},\Phi_{i,2})$. In [3], the maximum allowable period $T_i^{max}$ and the calculated $T_i$ are compared with each other for each task and whether all of the tasks satisfy $T_i<T_i^{max}$ is checked. Even if one task does not satisfy the condition, like [4-1], a schedulable parameter is set as false. If all of the tasks satisfy the condition, the schedulable parameter is set as true like [4-2]. In [5], the ACP returns the schedulable parameter and an output set τ' of the task set and ends [6].

The CP may verify schedule availability of all of the tasks through the schedulable parameter and receives an optimal parameter set calculated for the N tasks. As a result, the ACP calculates a pipeline parameter set $(T_i,\Phi_{i,1},\Phi_{i,2})$, that maximizes the resource availability while adjusting the phase so that the tasks are not collided with each other on the pipeline.

The present invention provides a concurrency-oriented method and an availability-oriented method as the method of determining the pipeline parameter in the pipeline scheduler. The concurrency-oriented method will be described as an example of FIG. 6.

Figure 6:
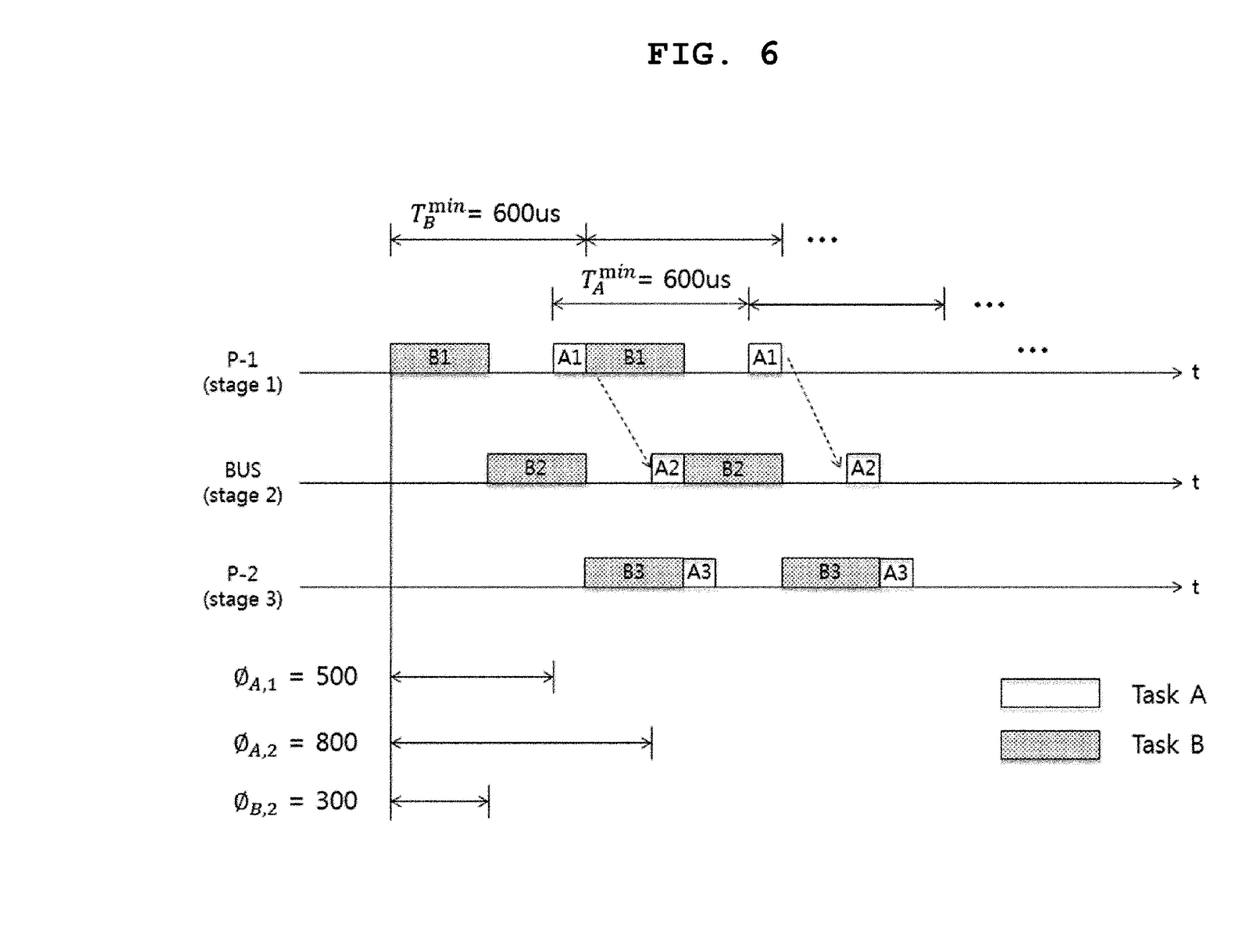
FIG. 6 is a diagram illustrating an application case of a method of determining concurrency-oriented parameters.

FIG. 6 is a diagram illustrating an application case of a method of determining concurrency-oriented parameters.

For example, when $\tau_A=(1000,000)$ and $\tau_B=(1000,300)$ are given with respect to the two tasks, the scheduling is performed by using the method of determining a concurrency-oriented parameter and a method of determining an availability-oriented parameter.

First, in the method of determining the concurrency-oriented parameter, three steps MT/Eth-DMA/Net-IRQH of the pipeline are allocated to processor 1—memory bus—processor 2, respectively. In a placement of an optimal step which may be obtained herein, as illustrated in FIG. 6, task A is determined to $(T_A,\Phi_{A,1},\Phi_{A,2})=(600, 500, 800)$ and task B is determined as $(T_B,\Phi_{B,1},\Phi_{B,2})=(600, 0, 300)$. The method of determining the concurrency-oriented parameter may be summarized by the following Equation.

[Equation 1]
$$T_i^{min} = \left(\sum_{i=1}^{N} E_i\right) + (E_N - E_1)$$

$$\Phi_{i,1} = \begin{cases} \left(\sum_{i=1}^{N} E_i\right) + 2\times(E_N - E_1) & \text{if } 1 \leq i \leq N-1 \\ 0 & \text{if } i = N \end{cases}$$

$$\Phi_{i,2} = \Phi_{i,1} + E_i + \delta_i$$

-continued where $$E_1 \le E_2 \le \ldots \le E_N, l = \delta_1 - 2 \times \sum_{k=1}^{i-1}(E_{k+1} - E_k)$$

and $$\delta_i = \begin{cases} E_N - E_1 & \text{if } i = 1 \\ \delta_1 - 2 \times \sum_{k=1}^{i-1}(E_{k+1} - E_k) & \text{if } i \ne 1 \text{ and } l > 0 \\ 0 & \text{otherwise} \end{cases}$$

$\delta_i$ is a delay time between steps 1 and 2 of an i-th task.

Referring to FIG. 6, steps 2 and 3 of the tasks are first disposed in order to apply the method of determining the concurrency-oriented parameter. The reason why the steps 2 and 3 are first disposed and the step 1 is disposed later is that the freedom degree of the step 1 is high because the delay time is inserted between the steps 1 and 2. A procedure is as follows.

1) In the method of determining the concurrency-oriented parameter, the steps 2 and 3 are disposed in order of the execution (in descending order in FIG. 6) so as to minimize an idle period of the resource. When the steps 2 and 3 are adjacently disposed in descending order of the execution time, in resources 2 and 3 (memory bus and processor 2), an idle period a total of EN-E1 occurs.

2) The step 1 is disposed from task 1, that is, a task disposed at the rightmost side. That is, a delay time is inserted between the steps 1 and 2 of the task 1. The delay time between the steps 1 and 2 of the task 1 becomes EN-E1 because steps 1, 2, and 3 are disposed in task N on the next cycle. All of the tasks 2 to N are influenced by the delay time of the task 1. If the displacement of the step 1 of the task 2 is not influenced by the delay time between the steps 1 and 2, the delay time between the steps 1 and 2 of the task 2 becomes 0.

If the task 1 influences a position where the step 1 of the task 2 starts, the delay time is inserted between the steps 1 and 2 of the task 2 so that the step 1 of the task 1 and the step 1 of the task 2 do not collide with each other. A delay time required between the steps 1 and 2 of the task is determined as Equation 1.

3) When the steps 2 and 3 of the tasks are disposed and the delay time value between the steps 1 and 2 is determined, phases in the steps 1 of all of the tasks are naturally determined as follows.

4) Finally, the cycles of all of the tasks are determined by a sum of the task execution time and the idle period.

Figure 7:
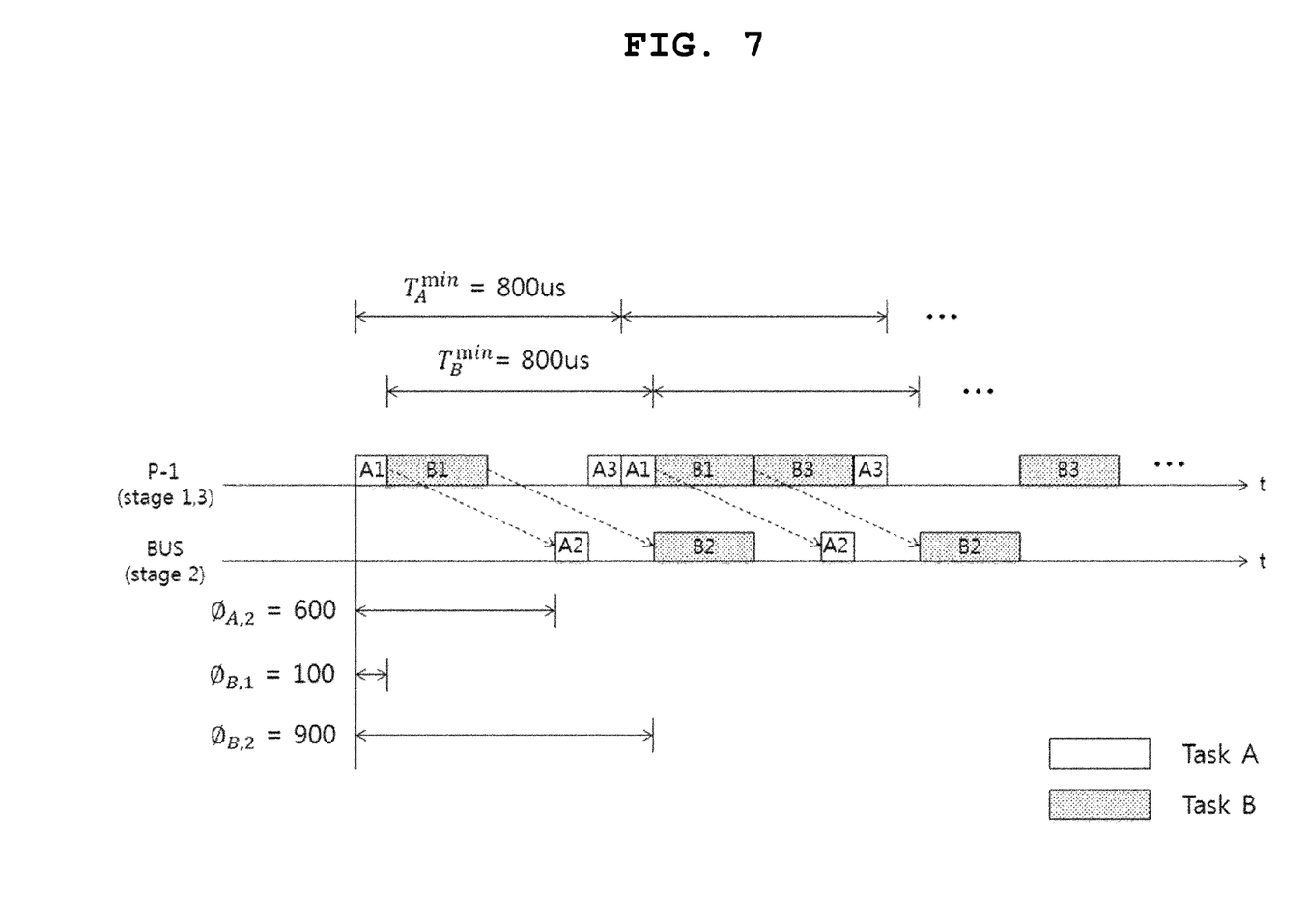
FIG. 7 is a diagram illustrating an application case of a method of determining availability-oriented parameters.

FIG. 7 is a diagram illustrating an application case of a method of determining availability-oriented parameters.

First, in the method of determining the availability-oriented parameter, three steps MT/Eth-DMA/Net-IRQH of the pipeline are allocated to processor 1—memory bus—processor 1, respectively. Similarly, in a placement of an optimal step obtained through scheduling, as illustrated in FIG. 7, task A is determined to $(T_A, \Phi_{A,1}, \Phi_{A,2})$=(800, 0, 600) and task B is determined as $(T_B, \Phi_{B,1}, \Phi_{B,2})$=(800, 100, 900). The method of determining the availability-oriented parameter may be summarized by the following Equation.

$$T_i^{min} = 2 \times \sum_{k=1}^{N} E_i \quad \text{[Equation 2]}$$

$$\Phi_{i,1} = \begin{cases} 0 & \text{if } i = 1 \\ E_1 & \text{if } i = N \text{ and } N = 2 \\ \sum_{k=i+1}^{N} E_k & \text{if } 2 \le i \le N-1 \text{ and } N > 2 \end{cases}$$

$$\Phi_{i,2} = \Phi_{i,1} + E_i + \delta_i$$

where, $$E_1 \le E_2 \le \ldots \le E_N$$

and $$\delta_i = \begin{cases} 2 \times \left(\sum_{i=2}^{N} E_i\right) - E_1 & \text{if } i = 1 \\ 3 \times \left(\sum_{i=2}^{N} E_i\right) + 2 \times E_1 - 2 \times E_i & \text{if } i \ne 1 \end{cases}$$

Referring to FIG. 7, even in the method of determining the availability-oriented parameter, steps 2 and 3 of the tasks are first disposed. A procedure is as follows.

1) The steps 2 and 3 of the tasks are most densely arranged. When describing an idle period of processor 1 without considering the memory bus and the idle period, an idle period EN-E1 is generated between steps 3 of the task 1 and the task N.

2, 3, and 4) The steps 1 of all of the tasks are arranged in order of 1, N, N-1, . . . , 2 between the steps 2 of the task 1 and the task 2. Since the steps 1, 2, and 3 of all of the tasks are arranged through the procedure, a delay time 2 between steps 1 and 2 of all the tasks, a step 1 phase 3, and a control cycle 4 are determined like Equation 2.

2-2) Performing Pipeline

The CP generates motion tasks and timers for forcing phases of all pipelines to transfer the parameters to the operating system. In □ of FIG. 4, the CP generates N motion tasks by using τ'$_i$(i=1, 2, . . . , N). In order to adjust the p0hase of the pipeline, the motion tasks are divided into a reference task and non-reference tasks. In FIG. 4, task 1 is the reference task and the remaining tasks 2, . . . , N are the non-reference tasks. In the task 1, since an execution start time of the task is a reference of the entire tasks, a task offset $\Phi_{1,1}$ is 0. The tasks generated by the CP generate task wakeup timers and I/O initiating timers, respectively, like □. All the tasks except for the task 1 set the task offset $\Phi_{i,1}$ (for i=2, 3, . . . , N) based on the task wakeup timer of the task 1. As a result, task 2 to task N wake up after a specific offset based on the time when the task 1 wakes up. The I/O initiating timers of the remaining tasks except for the task 1 also set an I/O offset $\Phi_{i,2}$ (for i=2, 3, . . . , N) based on the task wakeup timer of the task 1 like the task wakeup timer.

In summary, the phases of the pipeline steps are forced by the task wakeup timer or the I/O initiating timer, and the pipeline parameters are used for setting the timers.

A procedure of setting the task wakeup timer and the I/O initiating timer is deployed as follows based on FIG. 4. When a Linux operating system is exemplified, the CP calls a pthread_create function to generate N motion tasks (□-1, □-2, . . . , □-N). A reference task (task 1) among the generated motion tasks first calls a timerfd_create function to generate a task wakeup timer (□-11) and returns a timer descriptor (hereinafter, referred to as timer_fd) that refers to the timer. Since the reference task may approach the specific timer through timer_fd, timer_fd used in the reference task is defined as ref_timerfd. Then, the non-reference tasks may generate task wakeup timers ☐-11, ☐-21, ..., ☐-N1 and I/O initiating timers ☐-12, ☐-22, ..., ☐-N2 based on ref_timerfd and apply offset information ($\Phi_{i,1}, \Phi_{i,2}$) calculated by the ACP to the generated timers.

To this end, the present invention provides a new function of setting a phase of the timer based on ref_timerfd as follows.

Code 1 timerfd_set_offset function
void
    timerfd_set offset(int timer_fd, int ref_timer_fd, int offset);

The timerfd_set offset function receives a total of three factors as a system function. The first factor means timer_fd of a timer of setting the phase of the corresponding non-reference task, the second factor means timer_fd of a timer of awakening the reference task, and the final factor offset means an offset or an I/O offset of the task. When the timerfd set offset function is used, as illustrated in FIG. 8, a cycle start time of the non-reference task may be forced based on a cycle start time of the reference task.

Figure 8:
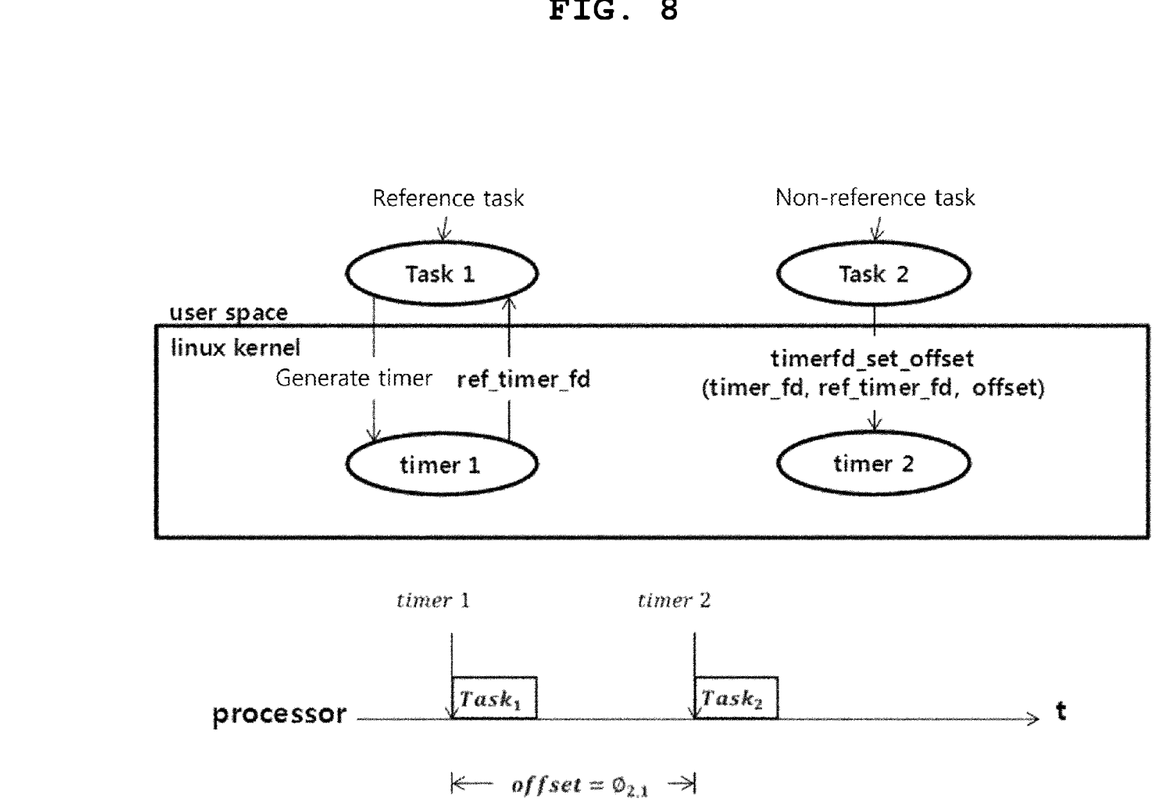
FIG. 8 is a diagram illustrating a phase (offset) setting for each step through a timerfd_set_offset function.

FIG. 8 is a diagram illustrating a phase (offset) setting for each step through a timerfd_set_offset function.

When a timer is set in an I/O driver, transmission of the packet may be performed at a predetermined time. The I/O driver does not perform the packet transmission of the tasks immediately after receiving the packet transmission of the tasks, but performs the packet transmission whenever the I/O timer set by each task wakes up. However, in the Linux operating system, since the function of generating the I/O timer is not provided, the present invention proposes the following function.

Code 2 netdev_timerfd_create function
int
    netdev_timerfd_create(int sock_fd, int thread_id, int clockid,
    int flags);

The netdev_timerfd_create function generates an I/O timer like timerfd_create and returns timer_fd. However, additionally, a thread id is transferred to the I/O driver represented by sock_fd. The I/O driver distinguishes the packet transmission through the requested thread id and transmits the packet by the timer allocated to each thread. Like the task offset, the respective timers that are managed by the I/O driver set the I/O offset through the timerfd_set_offset function.

While the present invention has been described with respect to the specific embodiments, it will be apparent to those skilled in the art that various changes and modifications may be made without departing from the spirit and scope of the invention as defined in the following claims.

The invention claimed is:

1. A method for scheduling a pipeline of multiprocessor-based motion control software, the method comprising:
   (a) calculating, by an admission control program, a parameter for scheduling a pipeline using a maximum allowable period and an execution time for each of N motion tasks, wherein the parameter includes an optimal periodic value, a task offset and an input/output offset for each of the N tasks;
   (b) generating, by a coordinator program, N motion tasks, wherein one of the N motion tasks is determined to be a reference task, and the other is determined to be a non-reference task;
   (c) allowing, by the reference task and the non-reference task, an operating system to generate a task wakeup timer and an input/output (I/O) initiating timer; and
   (d) setting, by the non-reference task, a task offset and an input/output offset for an own timer on the basis of the task wakeup timer of the reference task.

2. The method claim 1, wherein the pipeline includes first, second, and third pipeline steps.

3. The method claim 2, wherein a delay time is added between the first pipeline step and the second pipeline step, and the delay time is not added between the second pipeline step and the third pipeline step.

4. The method claim 2, wherein the first pipeline step includes a process of calculating, by the motion task, a motion trajectory based on motion state information collected in a previous cycle and requesting generation of an Ethernet packet and a process of transmitting and receiving, by an Ethernet drive, the an Ethernet master protocol stack generating a packet and the packet, the second pipeline step includes a process of transferring the packet from a memory bus to an Ethernet card and a process of receiving an Ethernet packet that circulates and returns motor drivers from the Ethernet card, and the third pipeline step includes a process of processing an Ethernet packet transmission/reception complete interrupt of the memory bus.

5. The method claim 4, wherein in step (a), the parameters are calculated by using a method of concurrency-oriented parameters in which the first pipeline step is allocated to a first processor, the second pipeline step is allocated to the memory bus, and the third pipeline step is allocated to a second processor.

6. The method claim 4, wherein in step (a), the parameters are calculated by using a method of availability-oriented parameters in which the first pipeline step is allocated to the first processor, the second pipeline step is allocated to the memory bus, and the third pipeline step is allocated to the second processor.

7. The method claim 1, wherein the step (a) includes determining whether an optimal cycle value of each of the N tasks is smaller than the maximum allowable period.

8. A non-transitory computer-readable medium having a program stored therein to perform a method for scheduling a pipeline of multiprocessor-based motion control software, the method comprising:
   calculating, by an admission control program, a parameter for scheduling a pipeline using a maximum allowable period and an execution time for each of N motion tasks, wherein the parameter includes an optimal periodic value, a task offset and an input/output offset for each of the N tasks;
   generating, by a coordinator program, N motion tasks, wherein one of the N motion tasks is determined to be a reference task, and the other is determined to be a non-reference task;
   allowing, by the reference task and the non-reference task, an operating system to generate a task wakeup timer and an input/output (I/O) initiating timer; and
   setting, by the non-reference task, a task offset and an input/output offset for an own timer on the basis of the task wakeup timer of the reference task.

9. An apparatus for scheduling a pipeline of multiprocessor-based motion control software, the apparatus comprising:
   a reception module configured to receive a maximum allowable period and an execution time for each of N motion tasks from a coordinator program;
   a parameter calculation module configured to calculate parameters for pipeline scheduling by using the maximum allowable period and the execution time, wherein the parameters include an optimal cycle value, a task offset, and an I/O offset; and a transmission module configured to transmit the calculated parameters to the coordinator program, wherein the coordinator program generates the N motion tasks, one of the N motion tasks is determined as a reference task and the remaining tasks are determined as non-reference tasks, the reference task and the non-reference task allows the operating system to generate a task wakeup timer and an I/O initiating timer, and the non-reference task sets a task offset and an I/O offset for a timer of the non-reference task based on the task wakeup timer of the reference task.

* * * * *